United States Patent
Hokkirigawa et al.

(10) Patent No.: US 7,132,155 B2
(45) Date of Patent: Nov. 7, 2006

(54) RBC OR CRBC FINE POWDER DISPERSING FOAM-MOLDED SYNTHETIC RESIN MATERIAL, METHOD FOR PREPARING SAME AND USES THEREOF

(75) Inventors: Kazuo Hokkirigawa, Yonezawa (JP); Motoharu Akiyama, Nagano-ken (JP); Morinobu Kawamura, Nagano-ken (JP)

(73) Assignee: Minebea Co., Ltd., Kitasaku-gun (JP)

( * ) Notice: Subject to any disclaimer, the term of this patent is extended or adjusted under 35 U.S.C. 154(b) by 65 days.

(21) Appl. No.: 10/317,945

(22) Filed: Dec. 12, 2002

(65) Prior Publication Data

US 2003/0134104 A1 Jul. 17, 2003

(30) Foreign Application Priority Data

Dec. 25, 2001 (JP) ............................. 2001-391783

(51) Int. Cl.
*B32B 5/22* (2006.01)
(52) U.S. Cl. ............................. 428/317.9; 428/315.5; 428/315.7
(58) Field of Classification Search ............. 428/317.9, 428/315.5, 315.7
See application file for complete search history.

(56) References Cited

U.S. PATENT DOCUMENTS

| 3,647,269 | A | * | 3/1972 | McKee | ........................ 384/470 |
| 4,073,552 | A | * | 2/1978 | Christy | ........................ 384/470 |
| 4,866,110 | A | * | 9/1989 | Lee | .............................. 524/11 |
| 6,395,677 | B1 | * | 5/2002 | Hokkirigawa et al. | ...... 502/402 |
| 6,569,816 | B1 | * | 5/2003 | Oohira et al. | ................ 508/107 |
| 6,573,215 | B1 | * | 6/2003 | Hokkirigawa et al. | ...... 502/402 |

OTHER PUBLICATIONS

Translation of "Functional Materials," Kino Zairyo, May 1997, vol. 17, No. 5, pp. 24-28.*

* cited by examiner

*Primary Examiner*—Hai Vo
(74) *Attorney, Agent, or Firm*—Flynn, Thiel, Boutell & Tanis, P.C.

(57) ABSTRACT

A foam-molded synthetic resin material in which a RBC or CRBC fine powder and bubbles are homogeneously dispersed. There is provided an electrically conductive molded resin material of sufficient porosity by using a fine powder of RB ceramics (RBC) or CRB ceramics (CRBC), in which a surface thereof is not covered with a skin layer while an electrically conductive material is directly bared on the surface, and a method for preparing same and uses thereof.

18 Claims, No Drawings

RBC OR CRBC FINE POWDER DISPERSING FOAM-MOLDED SYNTHETIC RESIN MATERIAL, METHOD FOR PREPARING SAME AND USES THEREOF

FIELD OF THE INVENTION

This invention relates to an electrically conductive foam-molded material made of a fine powder of RB ceramics (hereinafter referred to as RBC) or CRB ceramics (hereinafter referred to as CRBC) and a synthetic resin, a method for preparing same and uses thereof.

It has been known that Dr. Kazuo Hokkirigawa, the first inventor of the invention, proposed an idea to obtain a porous carbon material by the use of rice bran which is by-produced 0.9 million ton/year in Japan or 33 million ton/year in the world (see, Kinou Zairyou, Vol. 17, No. 5, pp. 24 to 28, published May, 1997).

This information describes a method for preparing a carbon material or so-called RB ceramics by mixing and kneading a defatted bran derived from rice bran and a thermosetting resin, press-molding the mixture to form a molded material, drying and baking the dried material in an atmosphere of inert gas. A thermosetting resin used herein may be any resin which can be thermally set and typically includes phenol-, diallylphthalate-, unsaturated polyester-, epoxy-, polyimide- and triazine resins. Preferably, a phenol resin is used.

A mixing ratio of the defatted rice bran and the thermosetting resin is in the range of 50 to 90:50 to 10 and preferably 75:25 by mass.

In general, baking is carried out at a baking temperature of 700 to 1,000° C. for about 40 to 120 minutes by means of a rotary kiln.

CRBC which is an improved carbon material of RBC is an improved material of RBC, which is also obtained from defatted rice bran and a thermosetting resin. The defatted bran derived from rice bran and the thermosetting resin are mixed and kneaded, primarily baked in an inert gas at 700 to 1,000° C. and ground to form a carbonized powder of about 100 mesh or less. The powder is then mixed and kneaded with the thermosetting resin to yield a mixture, press-molded at a pressure of 20 to 30 Mpa and further heat-treated the thus molded material in an atmosphere of inert gas at 500 to 1,100° C. to form CRBC as a black resin or porous ceramics.

Outstanding properties of RBC and CRBC are as in the following:

extremely high hardness;
particles are distorted;
extremely small heat expansion coefficient;
porous structure;
electrical conductivity;
low specific gravity or lightness;
extremely low friction coefficient;
improved abrasion resistance; and
less negative effect to global environment and more resource conservation due to rice bran to be used as a starting material.

This invention relates to a technique for preparing a foam-molded material by using finely pulverized RBC and/or CRBC as an electrical conductivity imparting material having an average particle diameter of 300 μm or less and more preferably 10 to 100 μm, which is mixed with a resin and a gas of high temperature and high pressure.

BACKGROUND OF THE INVENTION

It has conventionally done to foam-mold an electrically conductive powder such as metallic powder and carbon particles by mixing with a resin in the presence of carbon dioxide of high temperature and high pressure or supercritical state, nitrogen, etc. The surface of thus foam-molded material, however, is covered by a so-called skin structure as a resinous layer of non-cellular structure in which the electrically conductive powder is imbedded and not bared thereon, so that electrical conductivity on the surface is not enough to yield an electrically conductive molded product.

Further, it has been impossible to make the surface of molded resin porous to fill a lubricant such as oil therein.

SUMMARY OF THE INVENTION

Accordingly, it is an object of the invention to provide an electrically conductive molded resin material of sufficient porosity by using a RBC or CRBC fine powder, in which a surface thereof is not covered with a skin layer while an electrically conductive material is directly bared on the surface, and a method for preparing same.

Further, another object of the invention is to provide a fomam molded material comprising a RBC or CRBC fine powder, which is useful for developing a material of improved properties as a bearing retainer, thereby yielding epoch-making destaticized maintenance-free bearings.

The inventors have eagerly investigated specific properties of RBC or CRBC and found that the above mentioned objects can be achieved when a RBC or CRBC fine powder, a synthetic resin and a gas are homogeneously mixed under a condition of high temperature and high pressure and molded in a die followed by foam molding at normal pressure. The invention has developed on the basis of this fact.

A super-critically foam-molded material is typically prepared by homogeneously mixing a RBC or CRBC fine powder, a synthetic resin and a gas at high temperature and high pressure under a supercritical condition and molded in a die followed by foam molding at normal pressure. Carbon dioxide or nitrogen may be used as the gas and dissolved in the resin to a molecular level to conduct homogeneous mixing, molding in a die and foam molding at normal pressure.

The thus prepared product is a foam-molded synthetic resin material in which synthetic resin cells containing a RBC or CRBC fine powder and bubbles are homogeneously dispersed, an average diameter of these bubbles being 100 μm or less and generally 20 to 60 μm. Further, a volume of bubbles opened to the surface is not less than 5% and preferably 10 to 40% by volume of that of the foam-molded synthetic resin material in order to impart lubricant keeping properties as a retainer material for producing bearings.

PREFERRED EMBODIMENT OF THE INVENTION

A gas used in the invention includes an organic compound such as butane and pentane, or an inorganic compound or element such as carbon dioxide, air, hydrogen, nitrogen, neon and argon, or a mixture of two or more of them, although carbon dioxide or nitrogen is economical and desirable.

There may be employed any condition of high temperature and high pressure sufficient to melt a resin, disperse a RBC or CRBC fine powder and cause foaming when a pressure is released rapidly, however, a supercritical state of a gas to be used is more desirably employed to disperse the fine powder to a molecular level successfully.

A RBC or CRBC fine powder used in the invention has an average particle diameter of 300 μm or less. In particular, such a fine powder of 20 to 60 μm in average particle diameter makes the surface condition better and improves the oil absorbing properties and electrical conductivity.

A synthetic resin used in the invention includes thermoplastic resins such as polyamide, polyester and polyolefin. For example, there may be used thermoplastic resins such as nylon 66 (polyhexa-methyleneadipoamide), nylon 6 (polycaproamide), nylon 11 (poly-undecanoamide), nylon 12, polyacetal, polybutylene terephthalate, polyethylene terephthalate, polypropylene and polyethylene, and in particular, nylon 66 is preferably used among them. These thermoplastic resins may either be used alone or a combination of two or more.

Further, a thermosetting resin may be used together with the thermoplastic resins within the scope of the invention. Such a thermosetting resin includes phenol-, diallylphthalate-, unsaturated polyester-, epoxy-, polyimid- and triazine resins.

A ratio of RBC or CRBC fine powder to be added to a synthetic resin should be in the range of 30 to 90:70 to 10 by mass. The electrical conductivity would be decreased when the ratio of resin to be added is more than 70% by mass, while a difficulty in molding would be caused at the ratio less than 10% by mass.

In general, the mixture is molded by extrusion molding or injection molding. A better surface condition and improved oil absorbing properties as well as electrical conductivity can be obtained by ultrasonic irradiation during the extrusion or injection molding.

It has been found that better results can be obtained at a relatively low die temperature. The die temperature may basically be in the range of a glass transition point or melting point of the resin. In addition, it has also been found that a molded product of better surface condition can be yielded when the die is slowly cooled rather than quenching.

The embodiments of the invention will be summarized as in the following.

1. A foam-molded synthetic resin material in which a RBC or
   CRBC fine powder and bubbles are homogeneously dispersed.
2. A foam-molded synthetic resin material described in the above item 1 in which a mass ratio of RBC or CRBC fine powder to synthetic resin is 30 to 90:70 to 10.
3. A foam-molded synthetic resin material described in the above item 1 or 2 in which a volume of bubbles opened to a surface is not less than 2% by volume of an apparent volume of foamed material.
4. A foam-molded synthetic resin material described in any one of the above items 1 to 3 in which a synthetic resin is one or not less than two resins selected from a group consisting of nylon 66, nylon 6, nylon 11, nylon 12, polyacetal, polybutylene terephthalate, polyethylene terephthalate, polypropylene and polyethylene.
5. A foam-molded synthetic resin material described in any one of the above items 1 to 4 in which an average diameter of bubbles is 100 μm or less.
6. A foam-molded synthetic resin material described in any one of the above items 1 to 5 in which an average particle diameter of RBC or CRBC fine powder is 300 μm or less.
7. A foam-molded synthetic resin material described in above
   item 6 in which an average particle diameter of RBC or CRBC fine powder is 10 to 50 μm.
8. A method for preparing a foam-molded synthetic resin material comprising steps of homogeneously mixing a RBC or CRBC fine powder, a resin and a gas under a condition of high temperature and high pressure, filling a mixture thereof into a die and rapidly releasing a pressure to foam and mold the mixture.
9. A method for preparing a foam-molded synthetic resin material described in the above item 8 in which a gas is carbon dioxide or nitrogen and a condition of high temperature and high pressure is a supercritical state exceeding critical temperature and critical pressure of the gas.
10. A method for preparing a foam-molded synthetic resin material described in the above item 8 or 9 in which a molding process is carried out by extrusion molding or injection molding.
11. A method for preparing a foam-molded synthetic resin material described in the above item 10 in which extrusion molding or injection molding is carried out under ultrasonic irradiation.
12. A method for preparing a foam-molded synthetic resin material described in any one of the above items 8 to 11 in which a die temperature is in a range of glass transition point or melting point of the resin, while a die is slowly cooled.
13. A bearing retainer in which a foam-molded synthetic resin material described in any one of the above items 1 to 7 is used.

This invention will be further described in detail by the following examples.

EXAMPLE 1

Preparation of RBC Fine Powder

A defatted bran derived from rice bran in an amount of 750 g and a liquid phenol resin (resol) in an amount of 250 g were mixed and kneaded while heating at 50 to 60° C. to form a plastic and homogeneous mixture.

The mixture was baked by means of a rotary kiln in a nitrogen atmosphere at 900° C. for 100 minutes to form a carbonized material, which was ground by a grinder and screened through a 250-mesh screen to yield a RBC fine powder of 60 to 90 μm in average particle diameter.

Preparation of Mixture of RBC Fine Powder and Synthetic Resin

The thus obtained RBC fine powder in an amount of 500 g and a nylon 66 powder in an amount of 500 g were mixed and kneaded with heating at 240 to 290° C. to form a homogeneous and plastic mixture.

Preparation of Foamed Sheet

The RBC fine powder and nylon 66 were molten and mixed by means of a labo-plastomill to form a resin composition, which was used as a starting resin. A pressure vessel provided with a pressure gage and a pressure-relief valve was pre-heated to 280° C., charged with the starting resin and sealed with a lid. Carbon dioxide was injected in the pressure vessel to attain a supercritical state thereof and dissolved in the resin composition under a condition of injecting pressure at 15 MPa, resin temperature at 280° C., injecting time for 4 seconds and kneading time for 4.88 seconds.

The resin composition was filled into a die at 150° C. under pressure after a lapse of dissolving time, followed by a steep of rapidly releasing pressure from the injecting pressure down to a normal pressure (about 0.1 MPa).

EXAMPLE 2

Preparation of RBC Fine Powder

A defatted bran derived from rice bran in an amount of 750 g and a liquid phenol resin (resol) in an amount of 250 g were mixed and kneaded while heating at 50 to 60° C. to form a plastic and homogeneous mixture.

The mixture was baked by means of a rotary kiln in a nitrogen atmosphere at 1,000° C. for 100 minutes to form a carbonized material, which was ground by a grinder and screened through a 400-mesh screen to yield a RBC fine powder of 40 to 50 µm in average particle diameter.

Preparation of Mixture of RBC Fine Powder and Synthetic Resin

The thus obtained RBC fine powder in an amount of 700 g and a nylon 66 powder in an amount of 300 g were mixed and kneaded with heating at 240 to 290° C. to form a homogeneous and plastic mixture.

Preparation of Foamed Sheet

The RBC fine powder and nylon 66 were molten and mixed by means of a labo-plastomill to form a resin composition, which was used as a starting resin. A pressure vessel provided with a pressure gage and a pressure-relief valve was pre-heated to 280° C., charged with the starting resin and sealed with a lid. Carbon dioxide was injected in the pressure vessel to attain a supercritical state thereof and dissolved in the resin composition under a condition of injecting pressure at 15 MPa, resin temperature at 280° C., injecting time for 4 seconds and kneading time for 4.88 seconds.

Carbon dioxide was evacuated from the pressure vessel through the pressure relief valve after a lapse of dissolving time to steeply release a pressure therein from the injecting pressure to a normal level (about 0.1 PMa). The resin composition was then filled into a die at 150° C. while irradiating ultrasonic wave of 30 kHz in frequency at watt density of 1.0 W/cm² and cooled at a cooling rate of 3° C./minute to yield a sheet-like molded material of 40 µm in average bubble diameter and 2 mm in thickness.

EXAMPLE 3

Preparation of CRBC Fine Powder

A defatted bran derived from rice bran in an amount of 75 g and a liquid phenol resin (resol) in an amount of 25 g were mixed and kneaded by heating at 50 to 60° C. to form a plastic and homogeneous mixture.

The mixture was baked by means of a rotary kiln in a nitrogen atmosphere at 900° C. for 60 minutes to form a carbonized material, which was ground by a grinder and screened through a 200-mesh screen to yield a RBC fine powder of 100 to 120 µm in average particle diameter.

The thus yielded RBC fine powder in an amount of 75 g and a solid phenol resin (resol) in an amount of 50 g were mixed and kneaded while heating at 100 to 150° C. to yield a plastic and homogeneous material.

The plastic material was then press-molded into a sphere of about 1 cm in diameter at a die temperature of 150° C. at a pressure of 22 MPa.

The molded material was taken out of the die, heated in a nitrogen atmosphere at a heating rate of 1° C./minute up to 500° C., kept at 500° C. for 60 minutes and baked at 900° C. for about 120 minutes, which was then cooled at a cooling rate of 2 to 3° C./minutes down to 500° C. followed by natural heat dissipation under 500° C.

The thus heat-treated CRBC sphere was ground by a grinder, screened through a 500 mesh-screen to form a CRBC fine powder of 20 to 30 µm in average particle diameter.

Preparation of Mixture of CRBC Fine Powder and Synthetic Resin

The thus obtained RBC fine powder in an amount of 600 g and a nylon 66 powder in an amount of 400 g were mixed and kneaded with heating at 240 to 290° C. to form a homogeneous and plastic mixture.

Preparation of Foamed Sheet

The RBC fine powder and nylon 66 were molten and mixed by means of a labo-plastomill to form a resin composition, which was used as a starting resin. A pressure vessel provided with a pressure gage and a pressure-relief valve was pre-heated to 280° C., charged with the starting resin and sealed with a lid. The carbon dioxide was injected in the pressure vessel to attain a supercritical state thereof and dissolved in the resin composition under a condition of injecting pressure at 15 MPa, resin temperature at 280° C., injecting time for 4 seconds and kneading time for 4.88 seconds.

The resin composition was filled into a die at 150° C. under pressure after a lapse of dissolving time to release carbon dioxide through the pressure-relief valve from the pressure vessel, followed by a steep of rapidly releasing pressure from the injecting pressure down to a normal pressure (about 0.1 MPa).

EXAMPLES 4 TO 6 AND COMPARATIVE EXAMPLE 1

Foamed sheets of 2 mm in thickness were prepared under a condition shown in Table 1 by using the same RBC or CRBC fine powder as described in Examples 1 to 3 in the similar manner.

Further, a similarly foamed sheet was prepared by using a commercially available active carbon powder of 30 to 50 µm in average particle diameter instead of the RBC or CRBC fine powder for the purpose of conducting a comparative tests.

TABLE 1

|  | Ex. 4 | Ex. 5 | Ex. 6 | Comp. Ex. 1 |
| --- | --- | --- | --- | --- |
| fine powder | RBC (Ex. 1) | RBC (Ex. 2) | CRBC (Ex. 3) | active carbon* |
| syn. resin | PBT | PP | nylon 66 | nylon 66 |
| powder/resin | 40:60 | 30:70 | 30:70 | 30:70 |
| gas | $N_2$ | $CO_2$ | $N_2$ | $CO_2$ |
| resin temp. | 270° C. | 200° C. | 280° C. | 280° C. |
| die temp. | 100° C. | 50° C. | 150° C. | 150° C. |
| US wave-treatment | yes | yes | no | no |

PBT: polybutylene phtalate
PP: polypropylene
*active carbon: commercially available active carbon powder of 30 to 50 µm in average particle diameter Properties of foamed sheets prepared by Examples 1 to 6 and Comparative Example 1 are shown in Table 2.

TABLE 2

|  | Ex. 1 | Ex. 2 | Ex. 3 | Ex. 4 | Ex. 5 | Ex. 6 | Comp. Ex. 1 |
|---|---|---|---|---|---|---|---|
| AV bubble diameter (μm) | 50 | 40 | 30 | 60 | 30 | 40 | 40 |
| density (g/cm3) | 1.13 | 1.22 | 1.15 | 1.24 | 1.11 | 1.21 | 1.12 |
| spec. insulation resist. (Ω · cm) | $1.4 \times 10^4$ | $2 \times 10^3$ | $8.5 \times 10^4$ | $1.9 \times 10^4$ | $1.5 \times 10^4$ | $1.3 \times 10^4$ | $2.5 \times 10^4$ |
| oil absorption (vol. %) | 6 | 10 | 7 | 12 | 7 | 8 | 5 |

As has been described above, a foam-molded material of the invention in which synthetic resin cells consisting of a RBC or CRBC fine powder and bubbles are homogeneously dispersed is electrically conductive, capable of absorbing a lubricant such as oil and grease sufficiently, and also capable of keeping such a lubricant therein for a long period of time. These properties are favorable as a material for bearing retainer, which makes it possible to yield destaticized maintenance-free bearings.

What is claimed is:

1. A foam-molded synthetic resin material comprising a synthetic resin, a rice bran ceramics (RBC) or carbonized rice bran ceramics (ORBO) fine powder and bubbles homogeneously dispersed therein, the mass ratio of RBC or CRBC fine powder to synthetic resin is 30-90:70-10, the volume of bubbles open to a surface of the foam-molded synthetic resin material is at least 2% by volume of an apparent volume of the foam-molded synthetic resin material and the synthetic resin is at least one resin selected from the group consisting of nylon 66, nylon 6, nylon 11, nylon 12, polyacetal, polybutylene terephthalate, polyethylene terephthalate, polypropylene and polyethylene.

2. The foam-molded synthetic resin material claimed in claim 1, in which the average diameter of the bubbles is not more than 100 μm.

3. The foam-molded synthetic resin material claimed in claim 1, in which the average particle diameter of the RBC or CRBC fine powder is not more than 300 μm.

4. The foam-molded synthetic resin material claimed in claim 1, in which the average particle diameter of the RBC or CRBC fine powder is in the range of 10–50 μm.

5. A bearing retainer comprising the foammolded synthetic resin material claimed in claim 1.

6. The foam-molded synthetic resin material claimed in claim 1, comprising synthetic resin cells containing a RBC or CRBC fine powder and bubbles homogeneously dispersed therein.

7. The foam-molded synthetic resin material claimed in claim 1, in which a CRBC fine powder is contained therein.

8. The foam-molded synthetic resin material claimed in claim 1, in which a RBC fine powder is contained therein.

9. The foam-molded synthetic resin material claimed in claim 1, in which nylon 66 is contained therein.

10. The foam-molded synthetic resin material claimed in claim 1, in which at least one gas selected from the group consisting of butane, pentane, carbon dioxide, air, hydrogen, nitrogen, neon and argon is used to form the foam-molded synthetic resin material.

11. The foam-molded synthetic resin material claimed in claim 10, in which the at least one gas is carbon dioxide or nitrogen.

12. A foam-molded synthetic resin material in which a rice bran ceramics (RBC) or carbonized rice bran ceramics (ORBO) fine powder and bubbles are homogeneously dispersed, the foam-molded synthetic resin material comprising a synthetic resin which is at least one resin selected from the group consisting of nylon 66, nylon 6, nylon 11, nylon 12, polyacetal, polybutylene terephthalate, polyethylene terephthalate, polypropylene and polyethylene.

13. The foam-molded synthetic resin material claimed in claim 12, comprising synthetic resin cells containing a RBC or CRBC fine powder and bubbles homogeneously dispersed therein.

14. The foam-molded synthetic resin material claimed in claim 12, in which a CRBC fine powder is contained therein.

15. The foam-molded synthetic resin material claimed in claim 12, in which a RBC fine powder is contained therein.

16. The foam-molded synthetic resin material claimed in claim 12, in which nylon 66 is contained therein.

17. The foam-molded synthetic resin material claimed in claim 12, in which at least one gas selected from the group consisting of butane, pentane, carbon dioxide, air, hydrogen, nitrogen, neon and argon is used to form the foam-molded synthetic resin material.

18. The foam-molded synthetic resin material claimed in claim 17, in which the at least one gas is carbon dioxide or nitrogen.

* * * * *